United States Patent Office 2,808,418
Patented Oct. 1, 1957

2,808,418

CONDENSATION OF MALEIC ESTERS AND FATTY ESTERS

Stuart A. Harrison, Minneapolis, Minn., assignor to General Mills, Inc., a corporation of Delaware No Drawing. Application July 24, 1953, Serial No. 370,210

6 Claims. (Cl. 260—404.8)

The present invention relates to condensation products of maleic esters and fatty esters induced by certain peroxides. The condensation product is a high-boiling, viscous liquid which is an excellent plasticizer for resins, particularly the vinyl resins such a polyvinyl chloride, polyvinyl acetate, vinyl chloride copolymers and methyl acrylate-vinyl chloride copolymers. These condensation products serve to soften the vinyl resins and give products having excellent milling properties. Moreover, the plasticized products have very good color and in this respect are far superior to conventional plasticizers such as dioctyl phthalate. They are also particularly useful as secondary plasticizers when used in conjunction with dioctyl phthalate or other primary plasticizers.

It is, thererfore, an object of the present invention to provide novel condensation products of maleic esters and fatty esters which are condensed in the presence of peroxide.

As was pointed out above, the invention contemplates the condensation of certain fatty acid esters with maleic esters in the presence of certain peroxides. The fatty acid esters may be either esters of saturated or mono-olefinic higher fatty acids containing from 8–22 carbon atoms. Especially suitable are the esters of oleic, palmitic and stearic acid. The esters which are employed are the lower aliphatic esters of these fatty acids, especially the methyl, ethyl, propyl and butyl esters.

These fatty acid esters are condensed with lower aliphatic esters of maleic acid such as the methyl, ethyl, propyl and butyl esters. The peroxides which are employed are those having the formula ROOR$^1$ in which R is selected from the group consisting of hydrogen and hydrocarbon radicals, and in which R$^1$ is a hydrocarbon radical. In view of their stability, however, it is preferred to employ such peroxides as those containing a tertiary alkyl peroxy radical, for example ditertiary butyl peroxide, tertiary butyl hydroperoxide, cumene hydroperoxide and the like.

The condensation is effected by simply mixing the reactants and then heating them to a temperature in the range of 100–250° C. for a suitable period of time. The time which is employed will depend upon the temperature, the longer time periods being required for the lower temperatures. Generally, the time will vary within the range of 5–50 hours. In general, temperatures of 125–200° C. are preferred.

The quantity of peroxide which may be employed likewise may vary with the other variables such as the materials being employed, the temperature and the time. In general from a small but definite quantity of peroxide, the quantity may vary up to 10–15% by weight based on the combined weights of the fatty acid ester and the maleic ester. Generally, from 1–5% of the peroxide is sufficient.

For use as a plasticizer it is desirable to remove low boiling materials, and accordingly upon completion of the condensation the reaction mixture may be stripped under vacuum to remove decomposition products of the peroxide as well as any unreacted starting materials.

Example 1

The following materials were thoroughly mixed and placed in a sealed bottle after displacing air by nitrogen.

| | Grams |
|---|---|
| Ethyl maleate | 230 |
| Methyl esters of stearic and palmitic acid (saponification No. of esters 204.9) | 770 |
| Di-t-butyl peroxide | 31 |

The bottle was then heated to 170° C. for 17 hours, after which the product was distilled and the following fractions obtained:

| | Grams |
|---|---|
| Fraction I, b. range 85–120 at 1.3 mm. wt | 50.5 |
| Fraction II, b. range 120–162 at 1.3 mm wt | 570 |
| Residue—viscous liquid wt | 370 |
| Material in Dry Ice trap | 12 |

Fifty grams of the residue obtained above were mixed with 100 g. of Vinylite VYNW and milled on a hot mill. (Mill rolls heated with 50 lbs. steam). The material obtained milled smoothly and gave a very light-colored stock as compared to a stock containing a similar proportion of dioctyl phthalate. Volatility tests showed that this ester is lost from the plasticized stock about one half as fast as dioctyl phthalate.

Example 2

The following materials were mixed and heated to 170° C. for 17 hours in a sealed bottle under a nitrogen atmosphere.

| | Grams |
|---|---|
| Ethyl maleate | 10.6 |
| Methyl oleate | 35.4 |
| Di-t-butyl peroxide | 1.42 |

The reaction mixture was distilled to give 6.33 g. ethyl maleate, 25.4 g. methyl oleate and 12.44 g. of high boiling reaction product. The reaction product had a saponification value of 282.4, which indicated about 1.1 moles of methyl oleate per mole of ethyl maleate.

When a sample of the reaction product (5 g.) was mixed with Vinylite XYNW (10 g.) and milled on a hot mill, a light colored, smooth sheet was obtained. The plasticized sheet appeared to be similar to that obtained when the methyl stearate-palmitate-maleate reaction product was used as plasticizer.

The nature of the reaction is not clearly understood. However, from theoretical considerations it is postulated that the di-t-butyl peroxide decomposes to give t-butoxy radicals which then react chiefly with the fatty ester to abstract hydrogen atoms from the chain. In the case of the saturated esters, the most probable place for the ester to lose a hydrogen atom would be from the carbon adjacent to the carbonyl. In the case of the mono-unsaturated ester, there would be two additional likely positions for loss of hydrogen atoms. They are at the two carbons adjacent to the carbon-carbon double bond. The fatty ester radicals formed by the loss of the hydrogen atoms could then add to the maleic ester to give a new radical which in turn would react further as shown below.

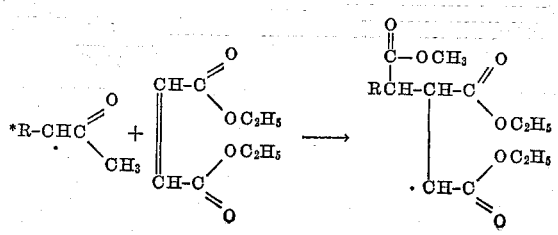

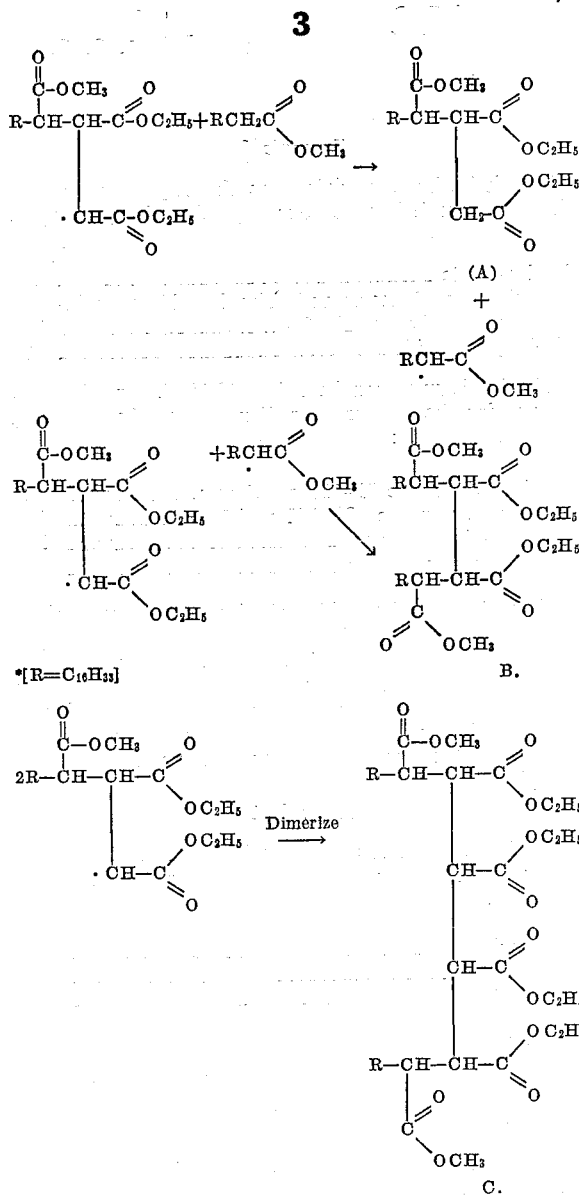

Evidence for the proposed structures is based on the saponification values of fractions of the product following distillation in a molecular still. A sample of the viscous liquid prepared in Example 1 was distilled in a centrifugal cyclic batch molecular still manufactured by Distillation Products Industries. The following fractions were taken.

| Fraction | Range of Liquid Temperature, °C. | Pressure, μ | Weight Percent | Saponification Value |
|---|---|---|---|---|
| 1 | 68–78 | 4.7 | 6.9 | 210 |
| 2 | 78–107 | 4.7 | 6.4 | |
| 3 | 107–119 | 5.3 | 7.1 | 341 |
| 4 | 119–128 | 5.2 | 7.2 | |
| 5 | 128–130 | 4.3 | 6.0 | 355 |
| 6 | 130–147 | 4.6 | 2.6 | |
| 7 | 147–155 | 4.8 | 7.6 | 381 |
| 8 | 155–160 | 4.8 | 6.7 | |
| 9 | 160–170 | 4.8 | 8.8 | |
| 10 | 170–185 | 6.8 | 7.1 | 377 |
| 11 | 185–200 | 9.5 | 3.5 | |
| Residue | | | 30.1 | 374 |
| | | | 100.0 | |

According to the distillation data, the first fraction was preponderantly the unreacted fatty esters. The succeeding fractions rapidly increase in saponification value showing them to be largely the adducts of fatty ester and maleic ester. The material coming over above 100° C. and below 160° C. is probably preponderantly the mono-adduct A whereas that coming over above that temperature has increasing amounts of the dimer C. The calculated saponification value for either A and C is about 377, the value found for fraction 10. The fractions are progressively more viscous, indicating increasing proportions of the dimer C.

The calculated saponification value for product B is about 312. It would distill between A and C. The distillation and saponification values indicate that little of it is formed.

I claim as my invention:

1. A process of condensing a lower aliphatic ester of a higher saturated fatty acid containing from 8–22 carbon atoms with a lower aliphatic ester of maleic acid which comprises heating said esters to a temperature within the approximate range of 100–250° C. in the presence of a peroxide having the formula $ROOR^1$ in which R is selected from the group consisting of hydrogen and a hydrocarbon group and $R^1$ is a hydrocarbon group.

2. A process of condensing a lower aliphatic ester of a higher saturated fatty acid containing from 8–22 carbon atoms with a lower aliphatic ester of maleic acid which comprises heating said esters to a temperature within the approximate range of 125–200° C. in the presence of a peroxide having the formula $ROOR^1$ in which R is selected from the group consisting of hydrogen and a hydrocarbon group and $R^1$ is a hydrocarbon group.

3. A process of condensing a lower aliphatic ester of a higher saturated fatty acid containing from 8–22 carbon atoms with a lower aliphatic ester of maleic acid which comprises heating said esters to a temperature within the approximate range of 100–250° C. in the presence of a tertiary alkyl peroxide.

4. A process of condensing a lower aliphatic ester of a higher saturated fatty acid containing from 8–22 carbon atoms with a lower aliphatic ester of maleic acid which comprises heating said esters to a temperature within the approximate range of 100–250° C. in the presence of a tertiary alkyl hydroperoxide.

5. Process of condensing a lower aliphatic ester of a saturated higher fatty acid containing 16–18 carbon atoms, with a lower aliphatic ester of maleic acid which comprises heating said esters to a temperature within the approximate range of 125–200° C. in the presence of ditertiary butyl peroxide.

6. Process of condensing a lower aliphatic ester of a saturated higher fatty acid containing from 8–22 carbon atoms with a lower aliphatic ester of maleic acid which comprises heating said esters to a temperature within the approximate range of 125–200° C. in the presence of ditertiary butyl peroxide.

References Cited in the file of this patent

UNITED STATES PATENTS

| 2,374,381 | Root | Apr. 24, 1945 |
| 2,510,915 | Spurlin | June 6, 1950 |
| 2,563,313 | Dazzi | Aug. 7, 1951 |

OTHER REFERENCES

Flett: Maleic Anhydride Derivatives, Wiley (1952), pp. 192, 193.